3,329,047
CHIPBREAKING METHOD

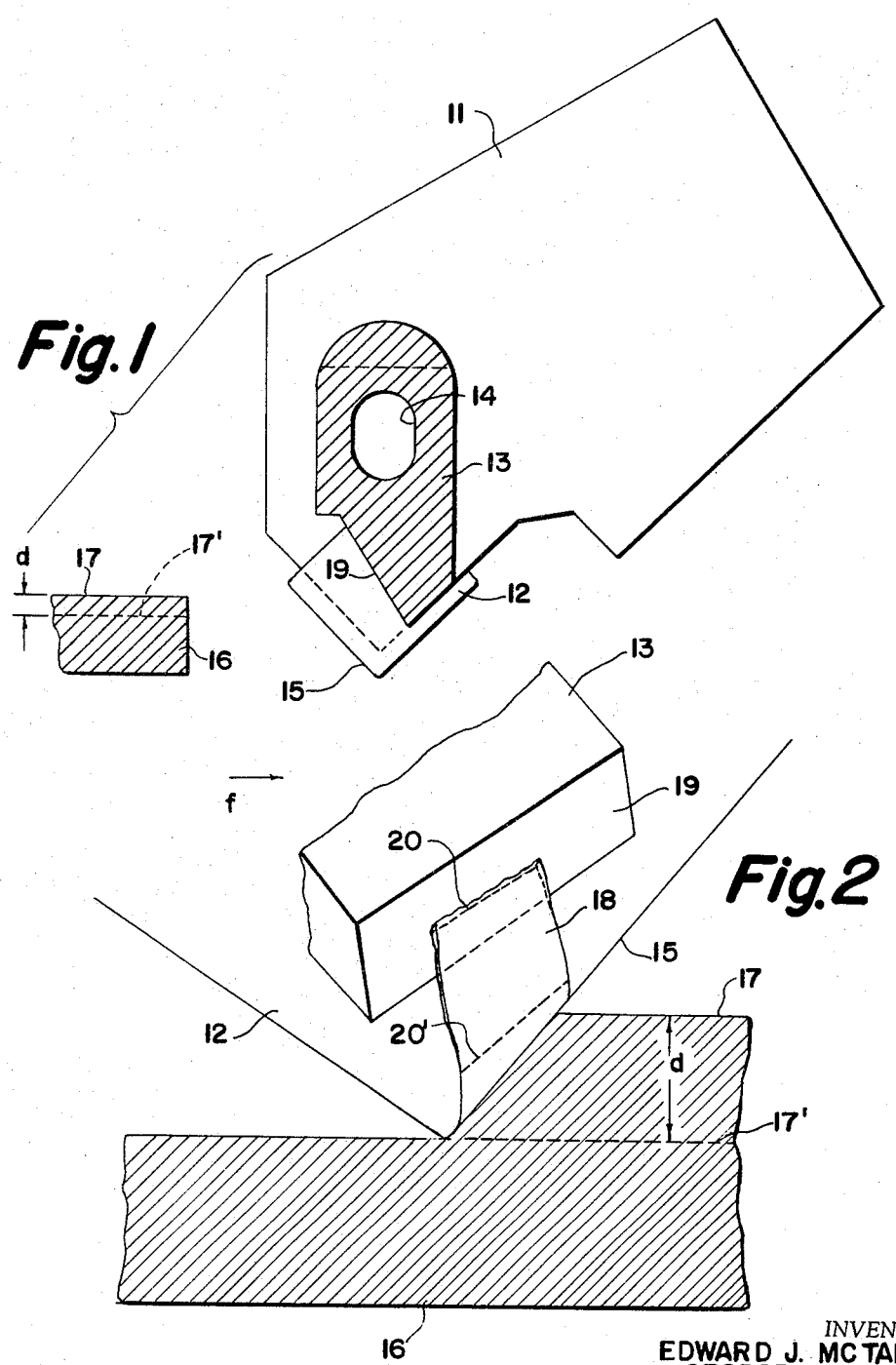

Edward J. McTamany, Philadelphia, and George E. Kane, Bethlehem, Pa., assignors to the United States of America as represented by the Secretary of the Army
Filed Aug. 19, 1965, Ser. No. 481,144
3 Claims. (Cl. 82—1)

The invention described herein may be manufactured and used by or for the Government for governmental purposes without the payment to us of any royalty thereon.

This invention realtes to methods of chipbreaking and, more particularly, to a method for breaking into chips the waste, shaving or continuous chip material being removed from a workpiece.

In the metal working arts, such as boring facing, turning, i.e. lathe operation, and the like, an operator of the machine or anyone occupying an adjacent position is often exposed to the danger of rapidly moving high temperature continuous chips containing very sharp edges as they are removed from the metallic workpiece. Conventional chipbreakers do not function as efficiently as desired, particularly where the work is in the ductile family of engineering metals.

One of the objects of the invention is to provide an improved method of chipbreaking for producing chip-breakage of maximum effectiveness.

Another object of the invention is to provide such a method which produces effective chip breakage of all types of metallic materials machined at high feed rates for considerable periods of time.

In one aspect of the invention the method of breaking into chips a waste metallic material flowing past a metal working surface in a predetermined direction, includes the steps of metal working metallic material at a predetermined rate to remove therefrom a predetermined amount of waste per unit of time in a predetermined direction, and placing a planar chip breaking surface normal to the predetermined direction of metallic waste flow.

These and other objects, features and advantages will become apparent from the following description and accompanying drawings in which:

FIG. 1 is a top plan view with certain parts shown in section of an arrangement by which the invention can be practiced.

FIG. 2 is an enlarged partial perspective view of certain parts during operation of the FIG. 1 arrangement with the workpiece shown in section.

In FIG. 1 a boring bar 11 is appropriately recessed to receive metal insert 12 between a lower portion of the bar 11 and an overlying chipbreaker 13, the parts being held in an assembled position by a suitable clamping means (not shown) which passes through a vertical passage 14 in the chipbreaker. The cutting edge 15 of the tool insert 12 is longitudinally or axially movable by means (not shown) toward a rotating workpiece 16, and appropriate means (also not shown) provide lateral translation of the tool to enable cuts to predetermined amounts to be taken upon the workpiece. In the boring operation shown in FIG. 1 the internal surface 17 of the workpiece is to be enlarged a predetermined amount "$d$" and thereby present a subsequently formed internal surface 17' (dotted lines).

The invention is equally applicable to other types of metal working such as facing, turning, and the like. For example, in a lathe operational environment a similar tool cutting edge, suitably secured between its holder and a similar chipbreaker, would be fed for working the external surface of a rotating workpiece; the axis of workpiece rotation being such that the tool is substantially outside the rotating workpiece.

As seen in FIG. 2, as the continuous shaving or waste metallic material 18 is removed from the rotating workpiece 16, by the tool cutting edge 15, it has a tendency to curl or coil driving its travel in a predetermined direction which is ascertainable from the equations:

$$\phi_s = \text{Arc tan} \frac{d}{d \tan \delta + f}$$

where $\phi_s$=horizontal angle of flow for sharp nosed tools relative to the longitudinal axis of the tool
$d$=depth of cut
$\delta$=side cutting edge angle
$f$=feed rate
or $$\phi_R = \text{Arc tan} \frac{d}{NR \text{ Cos Arc Sin} \frac{NR-d}{NR} + \frac{f}{2}}$$

where $\phi_R$=horizontal flow angle for round tools
$NR$=nose radius
and
$\rho = \text{Arc Tan} (\text{Sin } \phi \text{ Tan } B + \text{Cos } \phi \text{ Tan } \alpha)$
where
$\rho$=vertical angle of flow relative to the tool axis
$\phi$=horizontal flow angle
$B$=side rake angle
$\alpha$=back rake angle Preferably, a planar chip breaking surface 19 is presented in a plane wherein the end plane 20 of shaving 18 assumes a plane parallel thereto at the point of contact therewith. In FIG. 2 surface 19 is substantially a vertical plane and the adjacent shaving edge has attained a substantially horizontal transverse position. For any given predetermined direction of metallic shaving flow, the plane of surface 19 is altered or inclined accordingly to be placed normal to said flow at the point of contact with the shaving. In practice it has been found that, even after boring 45,000 workpieces, a neat line of rupture 20' will be provided successively at substantially the same position of the preceding line of rupture for the previous chip. Thus, the successive end planes of the shaving will advance from their corresponding fracture line 20' to plane 20 at the point of contact with the plane or surface 19.

Various changes, alterations or modifications may be resorted to without departing from the scope of the invention as defined in the appended claims.

We claim:
1. The method of breaking into chips a waste metallic material flowing past a metal working surface in a predetermined direction, comprising the steps of
metal working metallic material at a predetermined rate to remove therefrom a predetermined amount of waste per unit of time in a predetermined direction, and
placing a planar chip breaking surface normal to said predetermined direction of metallic waste flow.

2. The method of breaking into chips a continuous shaving of ductile metallic material removed by and flowing past a metal working surface in a predetermined direction, comprising the steps of metal working ductile metallic material at a predetermined rate to remove therefrom a predetermined amount of shaving per unit of time in a predetermined direction, and placing a planar chip breaking surface normal to said predetermined direction of metallic shaving flow at the point of contact with said shaving.

3. The method in accordance with claim 2 wherein successive end planes of said shaving are parallel to said chip breaking surface at said point of contact.

References Cited
UNITED STATES PATENTS 3,171,188   3/1965   Stier _____ 29—96
3,172,190   3/1965   Beach _____ 29—96

WILLIAM W. DYER, Jr., *Primary Examiner.*
LEONIDAS VLACHOS, *Examiner.*